April 26, 1927.
F. EGERSDÖRFER
ROTARY PUMP
Filed June 2, 1925
1,626,115
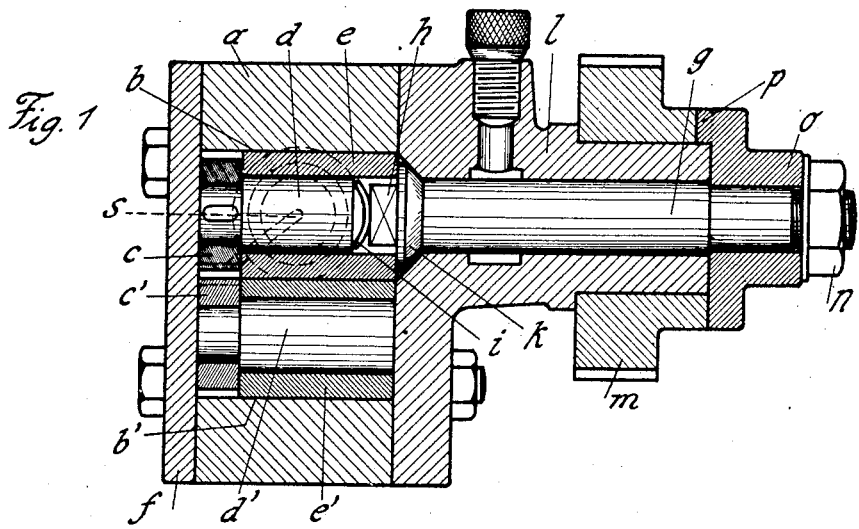
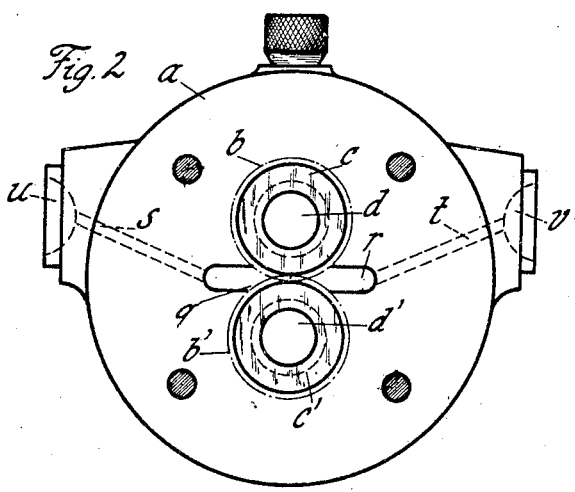
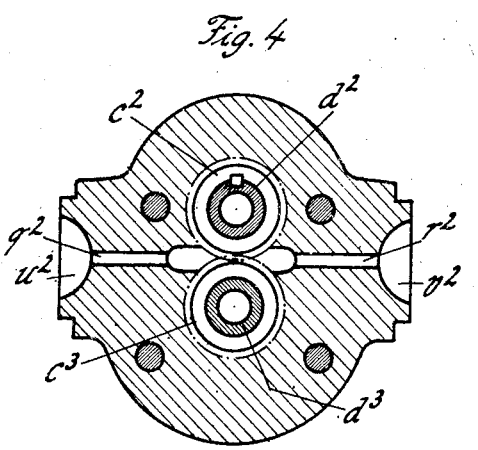
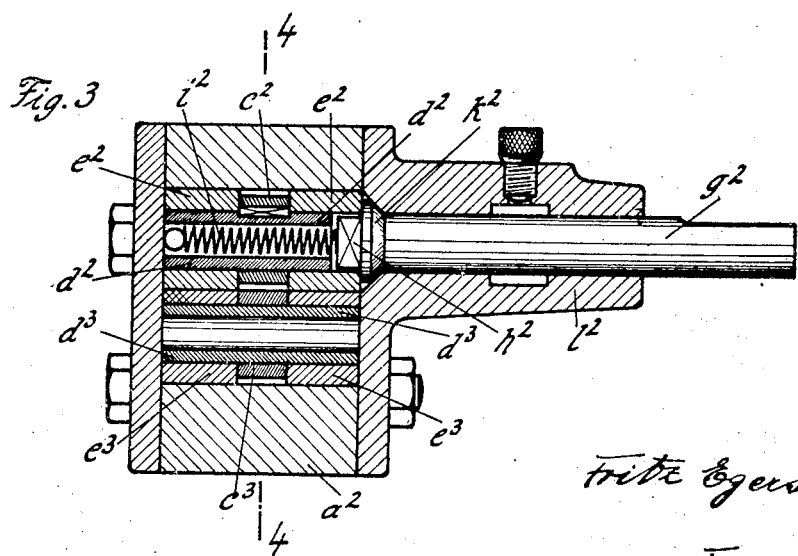
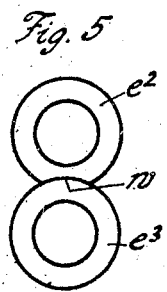
Inventor:
Fritz Egersdörfer
by Franz Reinhold.
Attorney:

Patented Apr. 26, 1927.

1,626,115

UNITED STATES PATENT OFFICE.

FRITZ EGERSDÖRFER, OF CHARLOTTENBURG, GERMANY.

ROTARY PUMP.

Application filed June 2, 1925, Serial No. 34,304, and in Germany October 2, 1922.

My invention relates to improvements in rotary pumps of the type comprising a pair of interengaging gear wheels mounted within adjacent cylindrical chambers connected with inlet and outlet passages opening into said chambers at opposite sides of the gear wheels. The object of the improvements is to provide a pump of this type in which there is practically no leakage of the liquid around the gear wheels, and with this object in view my invention consists in mounting the gear wheels and the trunnions or shafts thereof in the bores of a solid block, the trunnions or shafts of the gear wheels passing through bushings filling out the annular spaces between the said trunnions or shafts and the walls of the bores and being with their inner end faces in close contact with the end faces of the gear wheels. Thereby the bearings provided by the bushings are in exact alignment with the gear wheels, so that no transverse forces are exerted on the said gear wheels. Further, the bushings provide tight end walls for the suction and pressure chambers of the pump. In the preferred construction the bores are of even diameter throughout the axial length of the pump casing, and the outer diameters of the gear wheels and the bushings are alike. The total length of each gear wheel and cooperating bushings is equal to the axial length of the pump casing. Thereby I am enabled to finish the end faces of the pump casing and the bushings after assembling the said parts, which is important for insuring tight engagement between the said parts, as will be explained hereinafter.

For the purpose of explaining the invention two examples embodying the same have been shown in the accompanying drawing, in which the same reference characters have been used in all the views to indicate corresponding parts. In said drawing, Fig. 1, is a sectional elevation showing a pump in which the gear wheels are provided at the ends of the shafts, Fig. 2, is an end view looking from the left in Fig. 1 and with the head removed, Fig. 3, is a sectional elevation showing a modification in which the shafts project from the gear wheels to opposite sides.

Fig. 4, is a section taken on the line 4—4 of Fig. 3, and

Fig. 5, is a detail view showing the bushings in which the shafts or trunnions of the gear wheels are mounted.

In the example shown in Figs. 1 and 2 the pump comprises a casing $a$ made from an integral block and having two parallel bores $b$ and $b^1$ the diameter of which is equal to the outer diameter of the gear wheels $c$ and $c^1$. At one of their end faces the said gear wheels are provided with trunnions or shafts $d$ and $d^1$ mounted in bushings $e$ and $e^1$. The said bushings fill out the annular spaces between the shafts $d$ and $d^1$ and the walls of the bores of the pump casing and provide one of the end walls of the chambers enclosing the gear wheels. The outer wall of the said chambers is provided by a head $f$ bearing with its plane inner face on the plane end faces of the gear wheels. The inner end faces of the bushings and the inner face of the head $f$ are in tight contact with the end faces of the gear wheels preventing any leakage of the liquid.

The gear wheel $b$ is driven by a shaft $g$ mounted in a head $l$ and carrying a flat trunnion $h$ engaging in an axial slot of the trunnion $d$, a spring $i$ being located within the said slot. A collar $k$ formed on the shaft $g$ bears on the end face of the bushing $e$ and a conical end face provided at the opposite side of said collar is pressed by the spring $i$ into engagement with a conical socket formed in the head $l$ thus providing a joint confining the shaft $g$ in a tight way. The head $l$ is formed with a cylindrical end providing a bearing for a gear wheel $m$ formed with a slot engaged by a nose $p$ of a disk $o$ secured to the shaft $g$ by means of a nut $n$. The gear wheel $m$ is adapted for engagement with a gear wheel (not shown) for imparting rotary movement to the shaft $g$, the shaft $d$ and the gear wheels $c$ and $c^1$.

The outer end face of the body $a$ closed by the head $f$ is provided with grooves $q$ and $r$ covered by the said head and providing inlet and outlet ports for the pump, which ports are located between the end planes in the direction of the common tangent of the pitch lines of the gear wheels and therefore in the direction of the flow of the liquid admitted to and discharged from the gear wheels. Thereby a smooth and unobstructed flow of the liquid is insured, and dead spaces are reduced to a minimum. As appears from Fig. 2 the grooves $q$ and $r$ may be very short, and they are connected with inlet and delivery passages $u$ and $v$ by ducts $s$ and $t$. The ends of the grooves $q$ and $r$ are located a great distance away from the circumference of the end face of the body $a$, which results in a large tightening surface for the head $f$.

In the modification shown in Figs. 3 and 4 the gear wheels $c^2$ and $c^3$ are mounted on shafts $d^2$ and $d^3$ extending therefrom to both sides, the gear wheel $c^2$ being keyed to the said shaft $d^2$, and the said shafts are mounted at both ends in bushings $e^2$ and $e^3$ respectively, so that each gear wheel is bounded at opposite sides by a bushing, the gear wheels being located substantially at the middle of the body $a^2$. Also in this case the bushings fill out the annular spaces between the trunnions and the walls of the bores of the casing, and they provide tight joints for the gear wheels and the trunnions. Within an axial bore of the shaft $d^2$ there is a coiled spring $i^2$ which bears on the plane end face of the reduced flat end $h^2$ of the shaft $g^2$ and presses the conical end face of the collar $k^2$ into the conical socket of the head $l^2$. The inlet and outlet ports $q^2$ and $r^2$ are directly connected with the inlet and outlet passages $u^2$ and $v^2$.

In both examples the bushings $e$, $e^1$ and $e^2$, $e^3$ are constructed in the manner shown in Fig. 5. As shown in the said figure the bushings $e^2$ are in the form of non-reduced annular cylinders, while the walls of the bushings $e^3$ are formed with cut-out portions $w$ accommodating the non-reduced walls of the bushings $e^2$. By providing close contact between the end faces of the gear wheels and the adjacent end faces of the bushings and the head $f$, and by providing large bearing faces between the bushings and the shafts or trunnions of the gear wheels any leakage is prevented, and by yieldingly connecting the gear wheels $c$ and $c^2$ with the driving shaft side pressure is avoided. By composing the walls of the chambers enclosing the gear wheels of the faces of members such as the circumferential faces of the bores of the block $a$ or $a^2$, and the end faces of the bushings $e^2$ and $e^3$ or the end faces of the bushings $e$, $e^1$ and the face of the plate $f$, and separately finishing the said faces sharp corners are produced which exactly correspond to the sharp circumferential edges of the gear wheels, thus insuring tight contact between the said parts.

An important feature of my invention resides in that the inner end faces of the bushings $e^2$, $e^3$, or the inner end faces of the bushings $e$, $e^1$ and the plate $f$, are in close contact with the end faces of the gear wheels $c$, $c^1$ and $c^2$, $c^3$ respectively, so that there is no leakage of the liquid between the said end faces. To insure such close contact I prefer to manufacture the pump as follows: At first the bushings $e^2$ and $e^3$ located at one side of the gear wheels are placed one beside the other on the grinding machine, and their end faces are simultaneously finished, so that both bushings have exactly the same length. In a similar way the bushings $e^2$, $e^3$ located at the opposite side of the gear wheels, and thereafter the gear wheels $c^2$ and $c^3$ are simultaneously finished, so that adjacent parts have exactly the same length. Thereafter the said bushing and gear wheels are assembled in the block $a^1$, whereupon the said block and bushings are simultaneously finished in the grinding machine. When now assembling the pump the total length of the bushings and gear wheels is exactly the same as the length of the block $a^2$ taken in axial direction, and further the lengths of adjacent parts are alike. Thus close contact between the end faces of the gear wheels and the adjacent end faces of the bushings is insured.

The pump is particularly adapted for feeding small and accurately measured amounts of liquids under pressure, for example for feeding viscous matter to the spinning nozzles in the manufacture of artificial silk.

While in describing the invention reference has been made to two particular examples embodying the same I wish it to be understood that my invention is not limited to the constructions shown in the drawing, and that various changes may be made in the general arrangement of the apparatus and the construction of its parts without departing from the invention.

I claim:

1. A pump comprising a solid block formed with two parallel bores bounding each other and respectively having equal diameters throughout the length of said block, interengaging gear wheels having their adjoining end faces flush with each other and having projecting shafts, said gear wheels and shafts being disposed within said bores, bushings filling out the spaces between said shafts and the walls of said bores and engaging, with their inner end faces, the end faces of said gear wheels to the circumferences thereof, and means separate from said block for closing said bores at the ends opposite to said bushings, said means being in close contact with the end faces of said gear wheels to the circumferences thereof and with the adjacent parts of the wall of said block, the casing provided by said block, bushings, and closing means being formed with intake and delivery ducts.

2. A pump comprising a solid block having plane parallel end faces and formed with two parallel bores bounding each other and respectively having equal diameters throughout the length of said block, interengaging gear wheels having their adjoining end faces flush with each other and having projecting shafts, said gear wheels and shafts being disposed within said bores, bushings filling out the spaces between said shafts and the walls of said bores and engaging, with their inner end faces, the end faces of said gear wheels to the circumferences thereof, the total axial length of each set of bushings and gear wheels being equal to the axial length of said block, and heads fixed to the end faces of said block, the casing provided by said block, bushings and heads being formed with intake and delivery ducts.

3. A pump comprising a solid block formed with two parallel bores bounding each other and respectively having equal diameters throughout the length of said block, interengaging gear wheels having their adjoining end faces flush with each other and having shafts projecting from one of their end faces, said gear wheels and shafts being disposed within the bores of said block and the gear wheels having their end faces opposite to said shafts flush with the adjacent end face of said block, bushings filling out the spaces between said shafts and the walls of said bores and engaging the inner end faces of said gear wheels to the circumferences thereof, and a head fixed to the end face of said block opposite to said shafts and in close contact with the adjacent end faces of said gear wheels, the casing provided by said block and bushings being and formed with intake and delivery ducts.

4. A pump comprising a solid block having plane parallel end faces formed with two parallel bores bounding each other and respectively having equal diameters throughout the length of said block, interengaging gear wheels having their adjoining end faces flush with each other and having shafts projecting from one of their end faces, said gear wheels and shafts being disposed within the bores of said block and the gear wheels having their end faces opposite to said shafts flush with the adjacent end face of said block, bushings filling out the spaces between said shafts and the walls of said bores and engaging the inner end faces of said gear wheels to the circumferences thereof, and a head fixed to the end face of said block opposite to said shafts and in close contact with the adjacent end faces of said gear wheels, the casing provided by said block and bushings being formed with intake and delivery ducts, the total axial length of each set of bushings and gear wheels being equal to the axial length of said block.

5. A pump comprising a solid block formed with two parallel bores bounding each other and respectively having equal diameters throughout the length of said block, interengaging gear wheels having their adjoining end faces flush with each other and provided with shafts projecting from one of the end faces of said gear wheels, said gear wheels and shafts being disposed within the bores of said block and the gear wheels having their end faces opposite to said shafts lying flush with the adjacent end face of said block, bushings filling out the spaces between said shafts and the walls of said bores and engaging the inner end faces of said gear wheels to the circumferences thereof, and a head fixed to the end face of said block at the side opposite to said shafts and in close engagement with the adjacent end faces of said gear wheels, the total axial length of each set of bushings and gear wheels being equal to the axial length of said block, the casing provided by said block, bushings, and closing means being formed with intake and delivery ducts including, at their inner ends, grooves made in the end face of the block.

6. A pump comprising a solid block formed with two parallel bores bounding each other and respectively having equal diameters throughout the length of said block, interengaging gear wheels having their adjoining end faces flush with each other and each having a projecting shaft, said gear wheels and shafts being disposed within said bores, bushings filling out the spaces between said shafts and the walls of said bores and engaging with their inner end faces the end faces of said gear wheels to the circumferences thereof, and means separate from said block for closing said bores at the end opposite to said bushings, said means being in close contact with the end faces of said gear wheels to the circumferences thereof and with the adjacent parts of the wall of said block, the casing provided by said block, bushings, and closing means being formed with intake and delivery ducts, and a driving shaft yieldingly connected with the shaft of one of said gear wheels.

In testimony whereof I hereunto affix my signature.

FRITZ EGERSDÖRFER.